United States Patent [19]
Nguyen et al.

[11] Patent Number: 6,117,930
[45] Date of Patent: *Sep. 12, 2000

[54] RESIN SYSTEMS FOR ORGANOSILICON-CONTAINING COMPOSITIONS

[75] Inventors: My N. Nguyen, Poway; Yuan-Yung Chien, San Diego, both of Calif.

[73] Assignee: Johnson Matthey, Inc., Pa.

[*] Notice: This patent is subject to a terminal disclaimer.

[21] Appl. No.: 09/109,976

[22] Filed: Jul. 2, 1998

[51] Int. Cl.[7] .............................. C08K 3/38; C08K 3/08; C08K 3/34; C08K 83/00
[52] U.S. Cl. .................. 524/404; 524/439; 524/440; 524/492; 524/588
[58] Field of Search .................... 524/404, 492, 524/439, 440, 588; 525/92 G, 105

[56] References Cited

U.S. PATENT DOCUMENTS 5,300,569  4/1994  Drake et al. ............................. 525/78
5,852,092  12/1998  Nguyen ................................... 524/413
5,859,105  1/1999  Nguyen ................................... 524/588

OTHER PUBLICATIONS

Owens et al., "An Experimental Design Advisor and Neural Network Package", Design Advisor/Neural Analyzer, vol. 1, 1991, pp. 1–8.

*Primary Examiner*—Veronica P. Hoke
*Attorney, Agent, or Firm*—Christie, Parker & Hale, LLP

[57] ABSTRACT

Described is a resin mixture for an organosilicon-containing composition suitable for use as an adhesive and capable of rapid curing at low temperature. The composition comprises about 10 to 80 wt. % of an organic compound component and about 20 to 90 wt. % of one of boron nitride, silica or silver. The organic compound component comprises the reaction product of about 40 to 90 wt. %, of the reaction product of cyclic olefin and cyclic siloxane and about 10 to 60 wt. % rubber in liquid form. The resin mixture includes unsaturated liquid rubber having an attached functional group, and an average molecular weight of about 2,000 to 10,000.

14 Claims, 5 Drawing Sheets

RESIN SYSTEMS FOR ORGANOSILICON-CONTAINING COMPOSITIONS

BACKGROUND OF THE INVENTION

Organosilicon compositions have superior moisture resistance compared to epoxies, such as epoxy compositions that have been used as adhesives in electronic applications in, for example, the semiconductor packaging industry. However, prior efforts to increase toughness by formulating organosilicon compositions such as described in Leibfried U.S. Pat. No. 5,451,637 and Barnum U.S. Pat. No. 5,242,979 thermoset with very high crosslink density when fully cured and, as a result, are quite brittle and not suitable as adhesives for the IC packages to which they are intended because they tend to crack when subjected to mechanical stress such as thermal cycling/thermal shock.

Moisture-resistant organosilicon compositions, especially compositions with varying modulus of elasticity, are disclosed in co-pending application Ser. No. 08/629,826, filed Apr. 10, 1996 now abandoned and application Ser. No. 08/798,864, filed Feb. 11, 1997. now U.S. Pat. No. 5,859,105 It has now been discovered that such compositions may be improved further to increase their usefulness as an adhesive for electronic applications. The disclosure of the aforementioned applications are expressly incorporated herein by reference.

The present invention provides a novel organosilicon-containing composition suitable for use as an adhesive and capable of rapid curing at low temperature.

SUMMARY OF THE INVENTION

In accordance with the invention, there is provided an organosilicon-containing composition comprising about 10 to 80 wt. % of an organic compound component, e.g., resin mixture, and about 20 to 90 wt. % of one of boron nitride, silica and silver.

The organic compound component comprises the reaction product of about 40 to 90 wt. % of the reaction product of cyclic olefin and cyclic siloxane, and about 10 to 60 wt. % rubber in liquid form. In various embodiments, the composition includes about 20 to 50 wt. % boron nitride, 40–80 wt. % silica or about 60 to 90 wt. % silver particles. Advantageously, the organic compound component further comprises about 1 to 5 wt. % of platinum catalyst preferably in liquid form, and about 2 to 10 wt. % of vinyl silane. A rheology adjusting agent, such as silica, may also be added. Compositions as described are suitable for use as an adhesive and are capable of rapid curing at low temperature, e.g., not more than about three hours at 150° C. Resin systems may be formulated with improved adhesiveness by incorporating appropriate functional liquid rubbers. The resin system comprises unsaturated liquid rubber structures having attached thereto at least one functional group, and having an average molecular weight of about 2,000 to 10,000.

BRIEF DESCRIPTION OF DRAWINGS

FIG. 1 shows effect of styrene molecular structure on adhesion;

FIG. 2 shows effect of maleic anhydride and molecular weight on adhesion;

FIG. 3 shows effect of styrene and maleic anhydride on water absorption;

FIG. 4 shows effect of maleic anhydride and molecular weight on water absorption; and FIG. 5 shows effect of maleic anhydride and molecular weight on viscosity.

DETAILED DESCRIPTION

Figure 1:
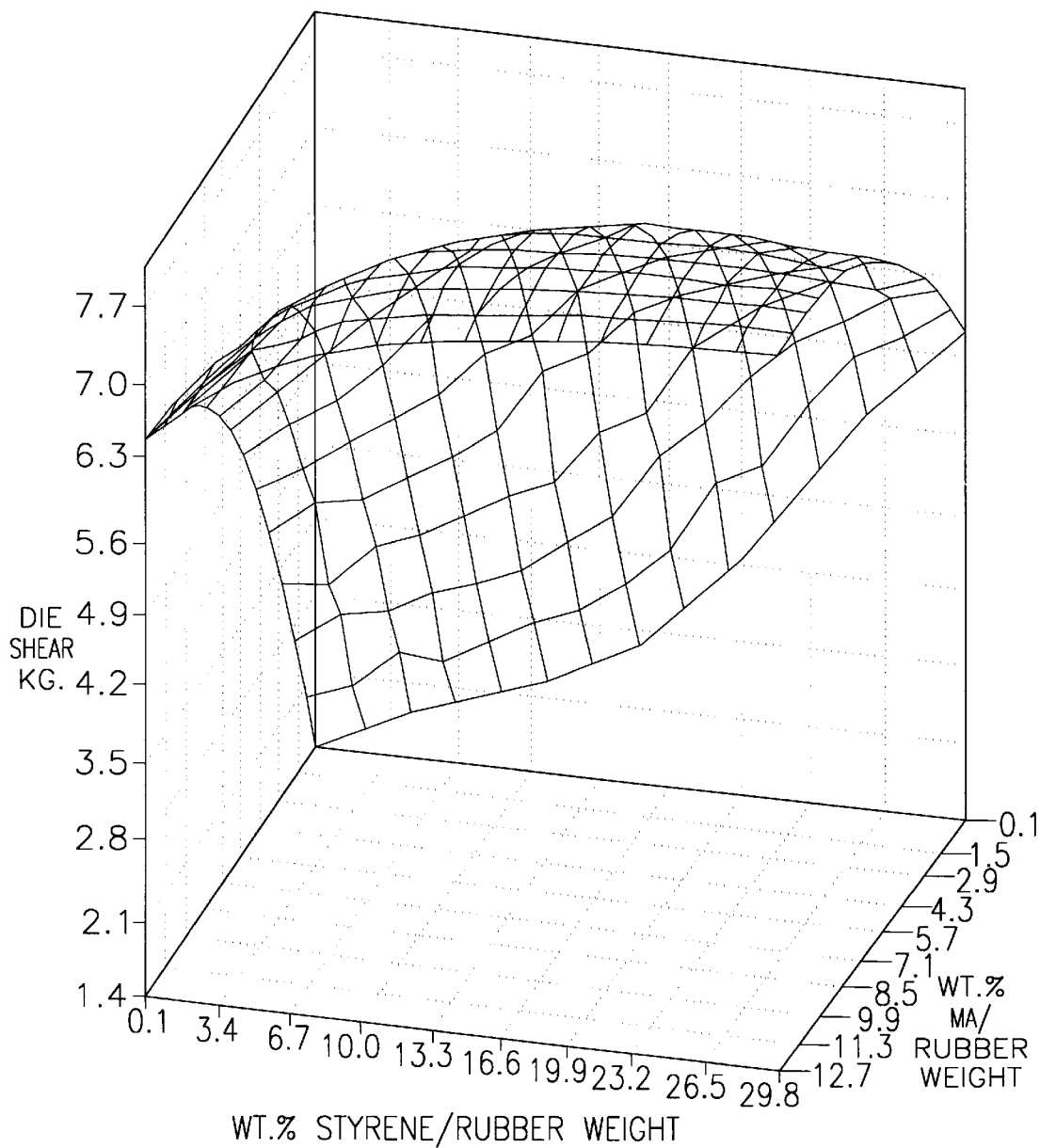
FIGS. 1 to 5 are three dimensional graphic illustrations of the effect of molecular structure of liquid rubber on various properties of organosilicon compositions.
Figure 2:
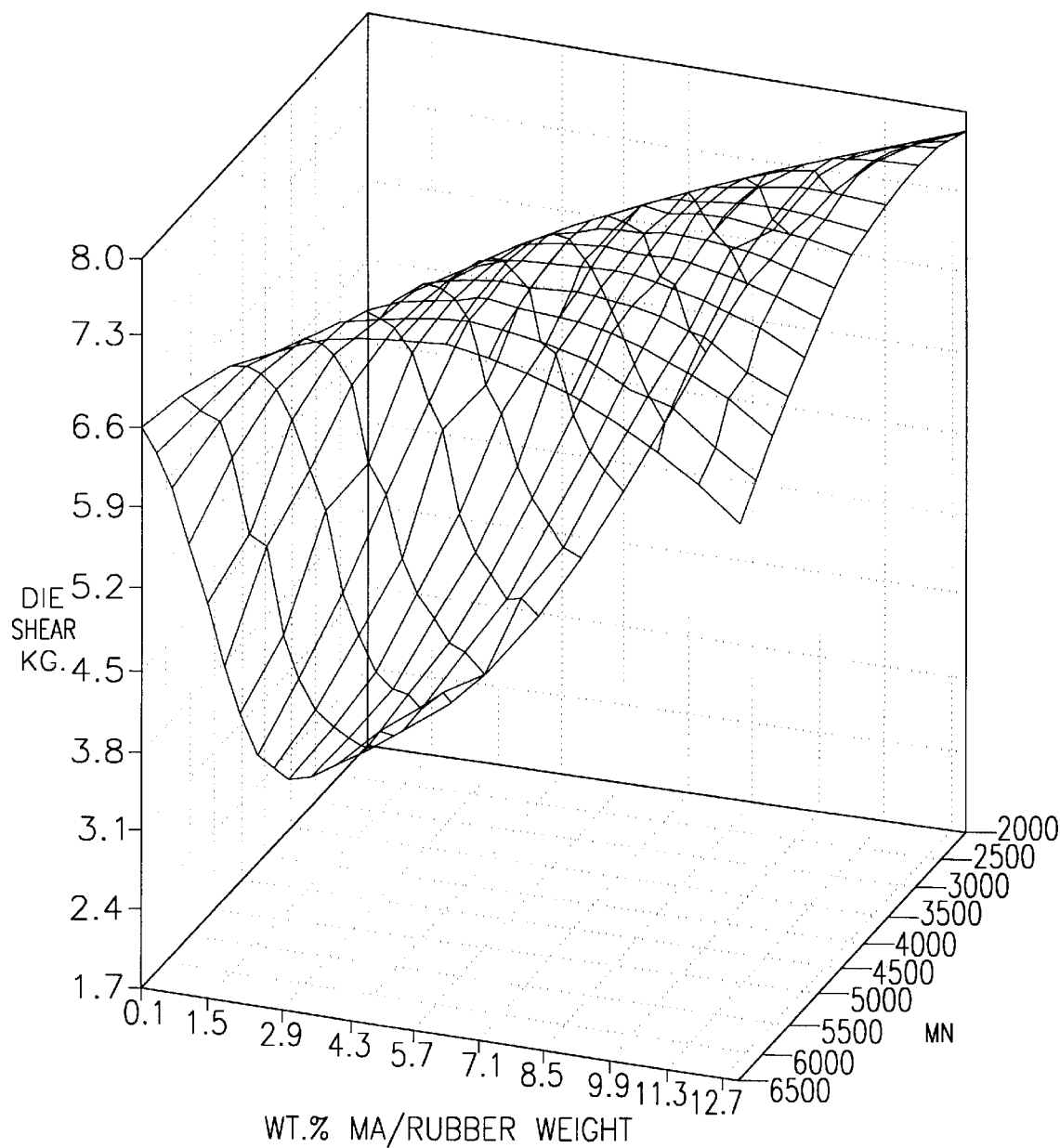
Figure 3:
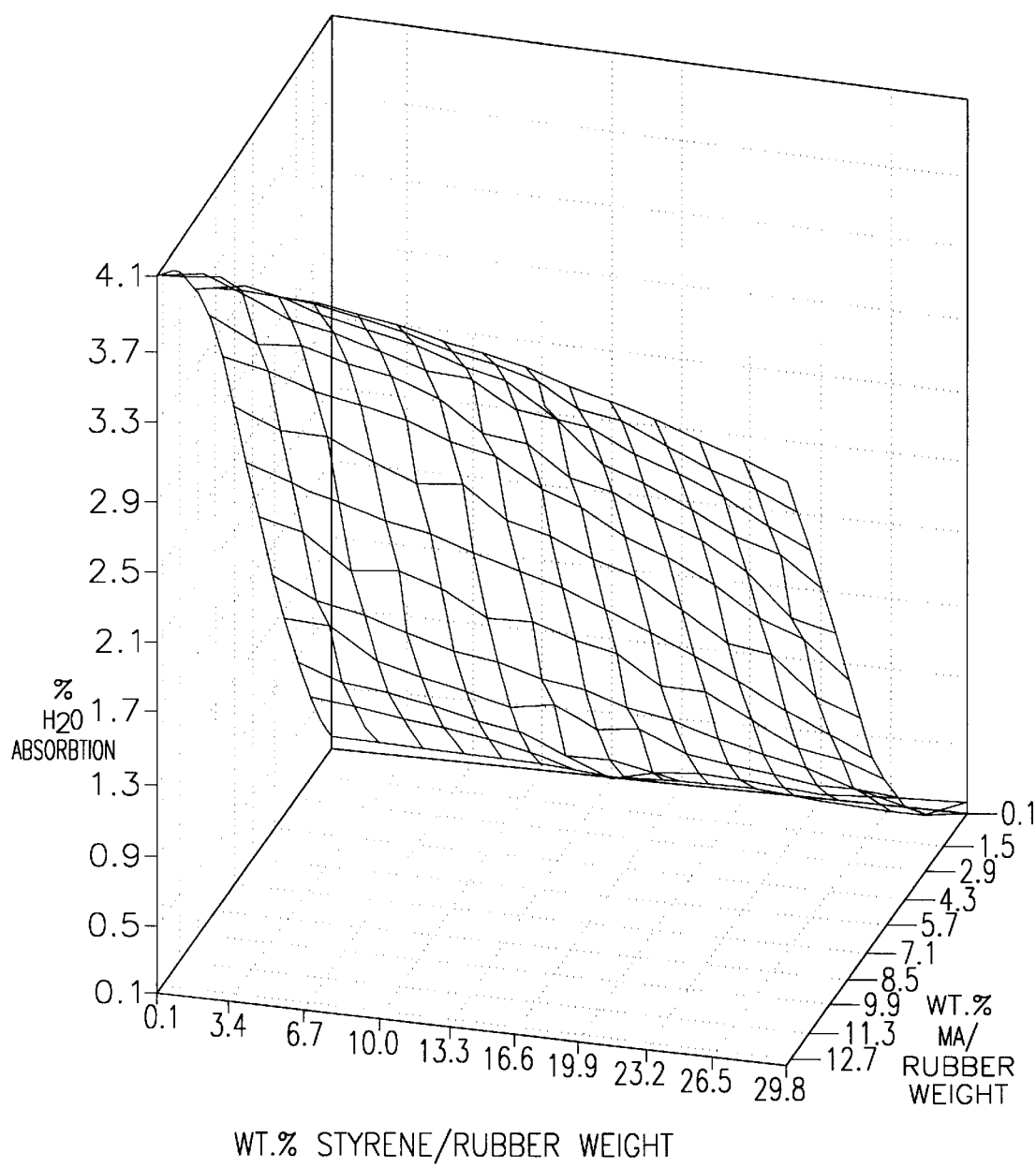
Figure 4:
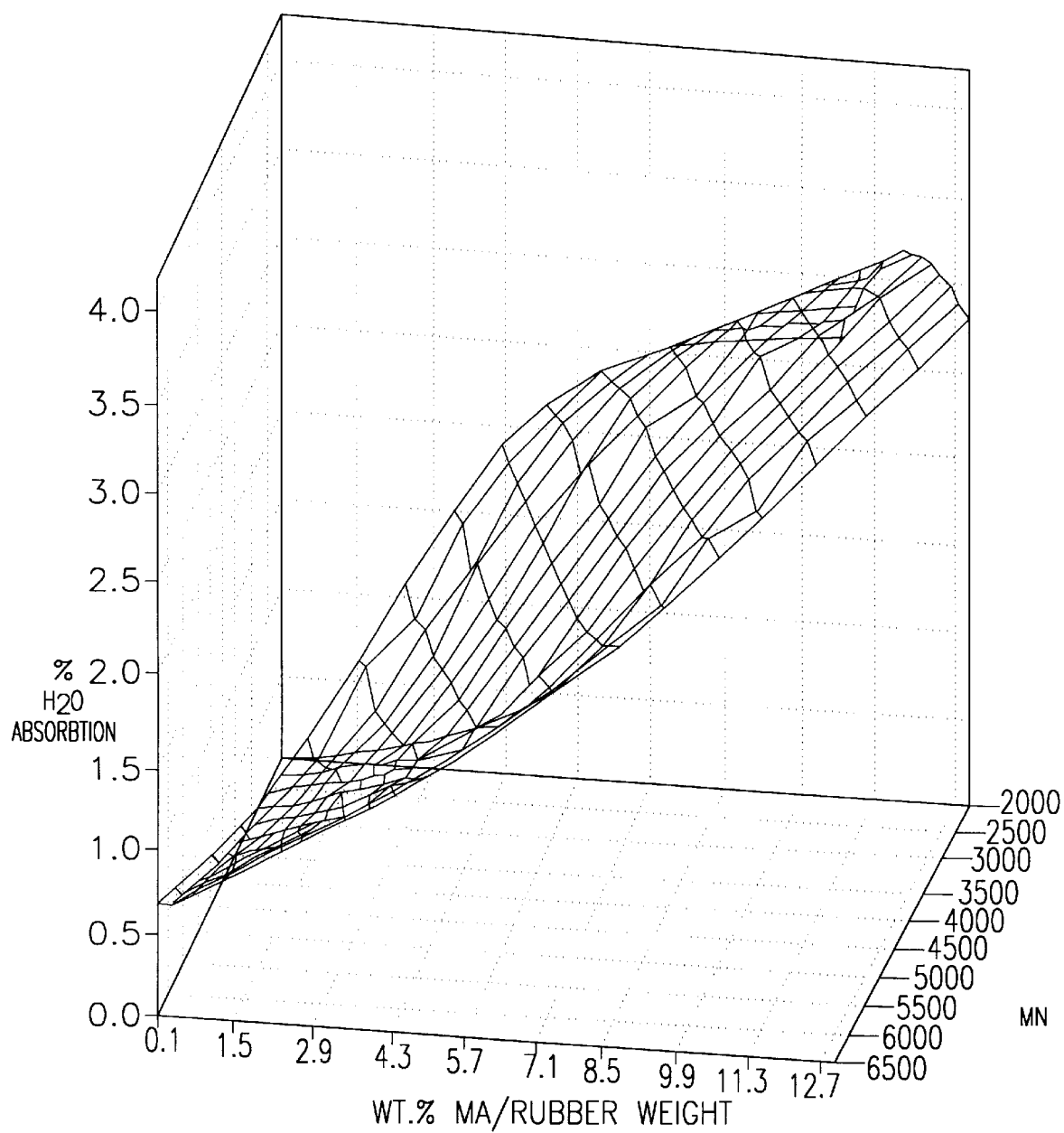
Figure 5:
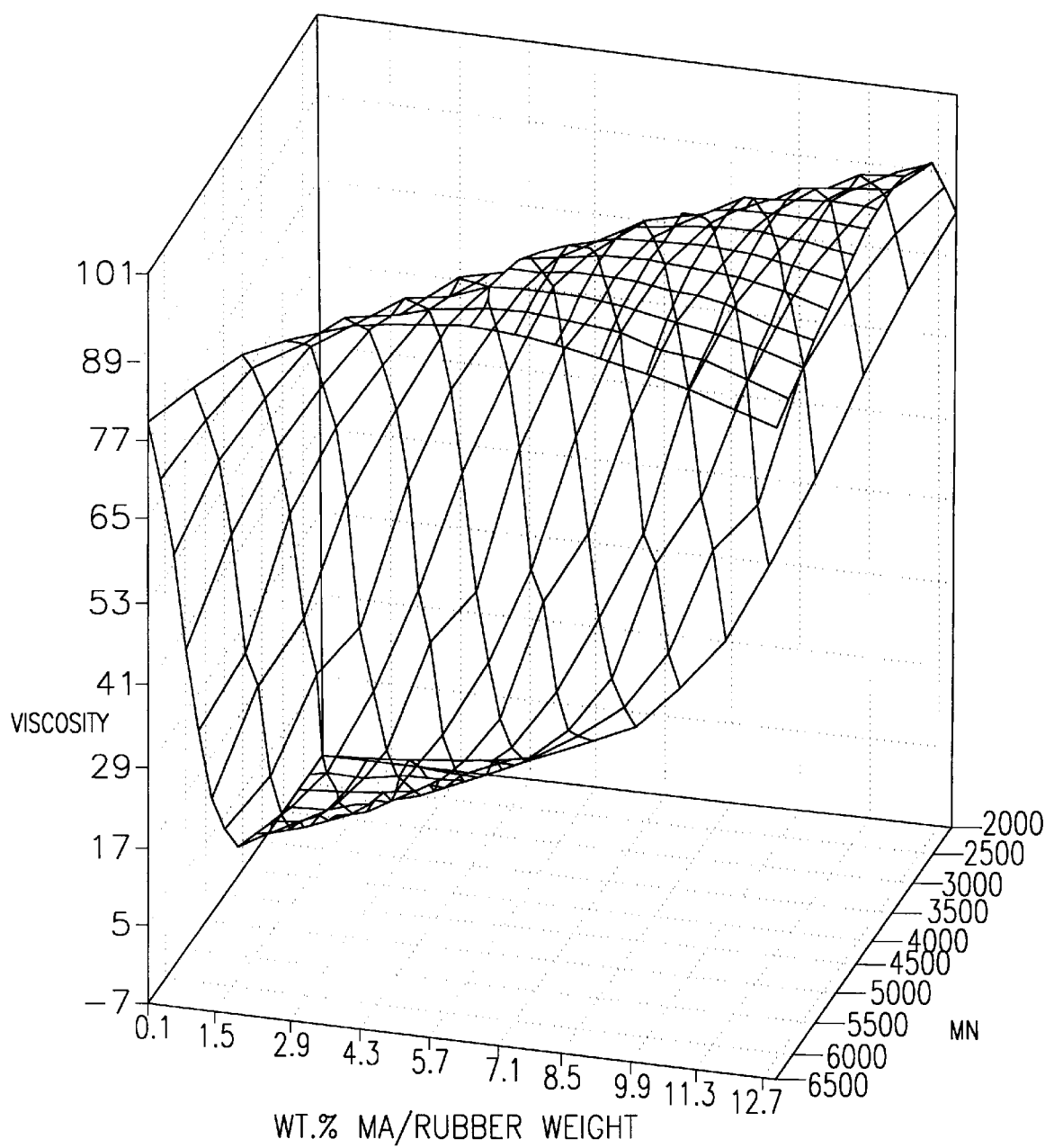

A resin system may be more useful as an adhesive for electronic applications by adding thermal filler particles such as boron nitride, silica or electrically conductive metal fillers such as silver, copper, etc.

The addition of fillers such as boron nitride or silica imparts properties required for specific applications. Boron nitride particles are especially advantageous because they are much softer and less abrasive compared to other ceramic fillers such as silica glass. Compositions with boron nitride exhibit a thermal conductivity two to three times higher than silica, which is especially advantageous for die attach/encapsulant applications. Silica filled compositions have lower expansion coefficients, lower cost required and flip chip application.

Electrically conductive compositions containing silver, etc. are desirable for many applications in the electronic industry. However, commercially available particulate silver, such as silver flakes, generally have lubricants, e.g., surfactants, coated on the surfaces of the particles. Such materials are added during the particulizing, i.e., flaking process, to control particle sizes and to preclude particle agglomeration. Most common lubricants are fatty acids, fatty acid esters, fatty alcohols or mixtures such as stearic acid, behenic acid, metal stearate, etc., commonly present in amounts of about 0.1 to 1%. These lubricants tend to have a detrimental effect on the curing reaction of organosilicon compositions and can result in little or no curing. It is advantageous to remove the lubricant by washing the flake with appropriate solvents such as acetone and then filtering and drying. However, even after washing, some amount of lubricant will generally remain.

Organosilicon-containing compositions may be formulated with about 10 to 80 wt. % of an organic compound component and about 20 to 90 wt. % of one of boron nitride, silica and silver or other electrically conductive filler. The organic compound component, hereinafter sometimes referred to as "resin mixture" or "resin system" comprises a reaction product of about 40 to 90 wt. % of the reaction product of cyclic olefin and cyclic siloxane, and about 10 to 60 wt. % rubber in liquid form. The reaction product of cyclic olefin and cyclic siloxane is available from Hercules, Inc. of Wilmington, Del., under the trade name "Sycar", and a suitable liquid rubber is available from Ricon Resins, inc., Grand Junction, Colo., under the trade name "Ricon", which is a liquid polybutadiene rubber. It is desirable for the resin mixture to be formulated as a liquid so that a paste can be made by the addition of particles of silver or boron nitride. Advantageously, a vinyl silane, such as available under the trade name A172 from OSI Specialties, may be added to enhance the adhesion. It is also advantageous to incorporate a platinum catalyst such as available under the trade name PC085 from Huels America, Inc., Piscataway, N.J., which is a platinum siloxane having about 2 wt. % platinum. Suitable platinum catalysts include platinum, divinyl, tetramethyldisiloxane which is a liquid form, or dichloro-1,5-cyclooctadieneplatinate, which is a powder form. The Sycar is available as a prepolymer which contains about 30 ppm platinum as a catalyst. With no additional amount of platinum catalyst added, the mixtures of Sycar and liquid rubber require several hours at 160° C. to fully cure (according to Leibfried '637). By adding additional amounts of platinum-containing catalyst, such as platinum cyclovinylmethylsiloxane ("PC 085") at an appropriate level, e.g., greater than 100 ppm, a low temperature/fast cure adhesive composition may be formulated which is well suited for applications in semiconductor packages. Such compositions demonstrate differential scanning colorimetry (DSC) desirable peaks of less than about 150° C., preferably less than about 100° C. The DSC peak is determined by heating an uncured sample at 5° to 10° C. per minute and then measuring the amount of heat given off by the curing reaction. When the reaction starts, more heat is given off. The DSC peak is therefore the temperature at which the maximum curing reaction occurs. Sycar is a reaction product of cyclic olefin and cyclic siloxane (U.S. Pat. No. 5,451,637). Suitable cyclic olefins are the "strained" olefin types containing at least 2 reactive carbon-carbon double bonds. Examples are cyclopentadiene oligomers (dicylopentadiene, tricyclopentadiene, etc.), norbonadiene and derivatives or combinations. The cyclic siloxanes contain at least 2 reactive SiH groups. The reactions of such cyclic olefin and siloxane can be promoted thermally by addition of hydrosilation catalyst containing platinum.

The Sycar product is a prepolymer liquid containing both SiH and C=C double bond as reactive sites. This component is further reacted with unsaturated liquid rubber in the presence of Pt catalyst to form a highly crosslinked, toughened thermoset. The type of useful functional liquid rubbers in such composition that will give improved adhesive strength are described.

The following describe the elastomer structures:

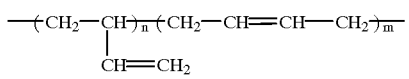

1,4 Polybutadiene

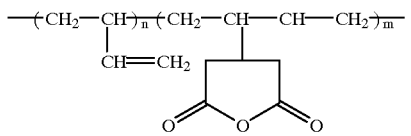

Polybutadiene abducted with maleic anhydride

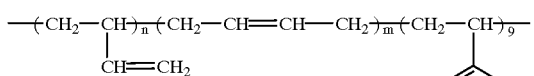

Styrene butadiene co-polymer

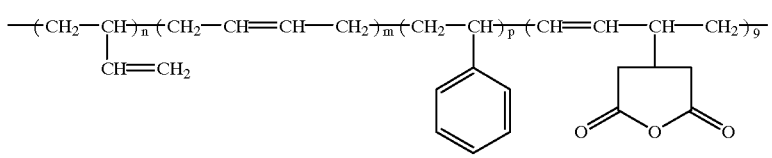

Where n, m, p, q, are repeated units.

Variables: Elastomer molecular weight Maleic anhydride (MA) content Styrene content Output: Adhesion Moisture absorption Viscosity Table 1 below describes the molecular weight (MN) and number of molecules for maleic anhydride (MA) and styrene, along with viscosity.

TABLE 1

| Sample | Mn | Wt. % MA | Wt. % Styrene | Viscosity Poise |
|---|---|---|---|---|
| E1 (*) | 2500 | 0 | 0 | 7 |
| E2 (*) | 4900 | 0 | 0 | 27 |
| E3 | 5300 | 5 | 0 | 150 |
| E4 | 3100 | 8 | 0 | 70 |
| E5 | 3100 | 13 | 0 | 265 |
| E6 | 3200 | 0 | 30 | 175 |
| E7 | 9900 | 6 | 30 | 1500 |

(*) Polybutadiene

The following examples illustrate compositions within the scope of the invention which comprise mixtures of organosilicon prepolymers, unsaturated liquid rubber, platinum-containing catalyst and thermally or electrically conducting fillers, including desirable resin system formulations. In the following examples, Samples A through G contain no fillers, H through J contain silver filler and K through N contain silica or boron nitride fillers.

Table 2 describes liquid resin mixtures (wt. %) and Table 3 describes properties of these mixtures:

TABLE 2

|  | A | B | C | D | E | F | G |
|---|---|---|---|---|---|---|---|
| Sycar | 60 | 60 | 60 | 60 | 60 | 60 | 60 |
| E1 | 40 | — | — | — | — | — | — |
| E1 | — | 40 | — | — | — | — | — |
| E3 | — | — | 40 | — | — | — | — |
| E4 | — | — | — | 40 | — | — | — |
| E5 | — | — | — | — | 40 | — | — |
| E6 | — | — | — | — | — | 40 | — |
| E7 | — | — | — | — | — | — | 40 |
| PC 085 (*) | 2.5 | 2.5 | 2.5 | 2.5 | 2.5 | 2.5 | 2.5 |

(*) Pt catalyst

TABLE 3

| Examples/Results | A | B | C | D | E | F | G |
|---|---|---|---|---|---|---|---|
| Adhesive strength (*) (kg) (BT substrate) | 0.7 | 1.9 | 5.2 | 5.3 | 5.7 | 3.9 | 7.7 |
| Au plated (*) (kg) | 1.0 | 2.8 | 5.7 | 6.8 | 6.0 | 5.0 | 7.1 |
| % Moisture Absorption (**) | 0.1 | 0.3 | 1.9 | 1.9 | 3.7 | 0.1 | 2.0 |
| Viscosity, poises | 1 | 3 | 7.5 | 5.2 | 18 | 15 | 100 |
| Radius of Curvature, meters | 2.0 | 2.0 | 2.0 | 2.0 | 1.9 | 0.8 | 0.8 |

(*) Die shear .080 × .080 inches Si die attach on prescribed substrate
(**) 150° C./ 100% RH/ 5 atm (Parr bomb test).

As can be seen, the percent moisture absorption increases with increasing level of maleic anhydride. however, moisture absorption is not sensitive to styrene content. Also, it is desirable to optimize the amount of MA, styrene and molecular weight in order to achieve best balance between adhesion, moisture absorption and viscosity.

Using a neural analyzer, it is possible to optimize resin mixture in formulations with respect to adhesion, moisture absorption, viscosity and radius of curvature ROC), as shown in Table 4.

TABLE 4

| Input | Optimized Value | | |
|---|---|---|---|
| Mn (molecular wt) | 3262 | | |
| MA (maleic anhydride) | 3.6 wt. % MA/Polybutadiene | | |
| Styrene | 18.0 wt. % Styrene/Polybutadiene | | |
| Output | Model Value | Target Minimum | Target Maximum |
| Adhesion (BT laminate) | 4.4 kg | 0.7 kg | 7.6 kg |
| Adhesion (Au Plate) | 5.7 | 1.0 kg | 7.0 kg |
| % Water absorption | 0.4 | 0.1 | 3.8 |
| Viscosity | 8.7 poises | 1.0 | 100 |
| ROC | 1.4 | 0.1 | 2.0 |

Additional examples in Table 5 include optimized base model and control examples.

TABLE 5

| Composition | H | I (Optimized Base Model) | J | Control |
|---|---|---|---|---|
| Sycar | 11.5 | 11.5 | 11.5 | 11.5 |
| E1 | — | 1.1 | — | 6.9 |
| E4 | 6.9 | — | — | — |
| E5 | — | 1.7 | — | — |
| E6 | — | 4.1 | 6.9 | — |
| Vinyl silane (A172) | 1.0 | 1.0 | 1.0 | 1.0 |
| Pt. Catalyst (PC085) | 0.5 | 0.5 | 0.5 | 0.5 |
| Fumed Silica (TS530) | 0.1 | 0.1 | 0.1 | 0.1 |
| Ag Flake | 80.0 | 80.0 | 80.0 | 80.0 |
| Viscosity (kcps) | 6.9 | 9.1 | 9.8 | 3.6 |
| Adhesion (kg) | 9.9 | 11.5 | 8.4 | 3.7 |
| Adhesion after moisture (150° C./100% RH, 72 hrs) | 7.5 | 9.0 | 7.5 | 4.1 |
| % Moisture absorption | 0.3 | 0.16 | 0.1 | 0.12 |

Table 6 describes additional formulations including thermally conductive fillers.

TABLE 6

| Composition | K (Control) | L (Optomized) | M (Control) | N (Optomized) |
|---|---|---|---|---|
| Sycar | 23 | 23 | 31.4 | 31.4 |
| E1 | 14 | 2.2 | 19.1 | 3.1 |
| E5 | 0 | 3.5 | 0 | 4.7 |
| E6 | 0 | 8.3 | 0 | 11.3 |
| Vinyl silane (A172) | 2 | 2 | 2.7 | 2.7 |
| Pt Catalyst (PC085) | 1 | 1 | 1.4 | 1.4 |
| Silica | 60 | 60 | 0 | 0 |
| Boron nitride | 0 | 0 | 45.4 | 45.4 |
| Viscosity, kcps | 8 | 10 | 8 | 10 |
| Adhesion, kg (*) | 2.1 | 7.0 | 2.5 | 8.1 |
| Adhesion after moisture (**) | 2.3 | 6.8 | 2.6 | 7.9 |
| % moisture absorption | 0.1 | 0.12 | 0.12 | 0.13 |
| DSC peak, C | 90 | 92 | 90 | 89 |

(*) Die shear 0.08 × 0.08 in Si attached on ceramic substrate, cured 3 min @ 150 C.
(**) 150 C./100% RH/72 hrs It is apparent from the foregoing that the invention enables improvement in adhesion of mixtures of organosilicon prepolymers, unsaturated liquid rubbers, Pt containing catalysts and thermally or electrically conductive fillers. The improvement is obtained by chemical modifications of the unsaturated liquid rubber structures to attach appropriate functional groups such as maleic anhydride, styrene, etc. Advantageous are functional liquid rubbers such as polybutadienes containing 1–15 wt. % MA per rubber weight, preferably 3–6 wt. % MA, 2–30 wt. % styrene per rubber weight, preferably 5–20 wt. % styrene, and molecular weight average about 2,000–10,000, preferably about 3,000–5,000. The term "rubber weight" is the total weight of the rubber. Such formulations provide at least 2 times increase in adhesion with minimal impact on moisture absorption.

The organosilicon-containing composition described provides improved adhesion, thermal conductivity and absence of cracking during thermal cycling. These properties are all important for adhesive compositions used in the electronics industry. In general, the adhesion depends on the ratio of Sycar to rubber in the range of 40 to 90 wt. % Sycar and 10 to 60 wt. % Ricon. Advantageously, the average particle size of boron nitride, silica and silver will be in the range of about 8 to 14 microns, with a maximum of about 50 microns when the composition is intended for use as a die attach adhesive. In applications such as glob top encapsulation, larger particle size can be used, e.g., up to about 100 microns.

It is apparent from the foregoing that various changes and modifications may be made without departing from the invention. Accordingly, the scope of the invention should be limited only by the amended claims, wherein.

What is claimed is:

1. A resin system for an organosilicon-containing composition suitable for use as an adhesive, said composition comprising about 10 to 80 wt. % of an organic compound component and about 20 to 90 wt. % of one of boron nitride, silica and silver; said organic compound component comprising the reaction product of about 40 to 90 wt. % reaction product of cyclic olefin and cyclic siloxane and about 10 to 60 wt. % rubber in liquid form; said resin system comprising unsaturated liquid rubber structures having attached thereto at least one functional group, and having an average molecular weight of about 2,000 to 10,000.

2. A resin system according to claim 1 wherein the average molecular weight is about 3,000 to 5,000.

3. A resin system according to claim 1 wherein the functional group comprises maleic anhydride, styrene or combinations thereof.

4. A resin system according to claim 1 wherein the functional group comprises maleic anhydride.

5. A resin system according to claim 1 wherein the functional group comprises styrene.

6. A resin system according to claim 1 containing polybutadiene liquid rubbers.

7. A resin system according to claim 6 wherein the polybutadiene contains 1 to 15 wt. %, preferably 3 to 6 wt. % of maleic anhydride per rubber weight.

8. A resin system according to claim 6 wherein the polybutadiene contains about 2 to 30 wt. % styrene, preferably 5 to 20 wt. %, per rubber weight.

9. A resin mixture according to claim 1 wherein the organic compound component further comprises about 1 to 5 wt. % of platinum catalyst with or without about 2 to up to 10 wt. % of vinyl silane.

10. A resin mixture according to claim 1 wherein the organic compound component further comprises about 1 to 5 wt. % of platinum catalyst in liquid form and about 2 to 10 wt. % of vinyl silane, wherein either the surfactant coating is one that does not significantly poison the platinum catalyst or the amount of platinum catalyst is sufficient to overcome adverse effects of the surfactant present.

11. A resin mixture according to claim 1 with one of boron nitride, silica and silver being in the form of particles less than about 50 microns in size.

12. A resin mixture according to claim 1 wherein the organosilicon-containing composition includes a rheology adjusting agent.

13. A resin mixture according to claim 12 wherein said rheology adjusting agent comprises silica particles less than about 1 micron in size.

14. A resin mixture according to claim 9 wherein the platinum catalyst comprises platinum siloxane with about 2 wt. % platinum.

* * * * *